(12) United States Patent
Mansouri Rad et al.

(10) Patent No.: US 10,386,582 B2
(45) Date of Patent: Aug. 20, 2019

(54) METHOD AND APPARATUS FOR OBTAINING OPTICAL MEASUREMENTS AT AN OPTICAL COUPLER HAVING TWO INPUTS AND TWO OUTPUTS

(71) Applicants: Mohammad Mehdi Mansouri Rad, Kanata (CA); Dominic John Goodwill, Ottawa (CA); Jia Jiang, Kanata (CA)

(72) Inventors: Mohammad Mehdi Mansouri Rad, Kanata (CA); Dominic John Goodwill, Ottawa (CA); Jia Jiang, Kanata (CA)

(73) Assignee: HUAWEI TECHNOOGIES CO., LTD., Shenzhen (CN)

( * ) Notice: Subject to any disclaimer, the term of this patent is extended or adjusted under 35 U.S.C. 154(b) by 1 day.

(21) Appl. No.: 15/251,782

(22) Filed: Aug. 30, 2016

(65) Prior Publication Data

US 2018/0059332 A1   Mar. 1, 2018

(51) Int. Cl.
G02B 6/12 (2006.01)
G02B 6/35 (2006.01)
(Continued)

(52) U.S. Cl.
CPC ....... *G02B 6/3588* (2013.01); *G02B 6/12004* (2013.01); *G02B 6/2766* (2013.01);
(Continued)

(58) Field of Classification Search
CPC .. G02B 6/2773; G02B 6/2766; G02B 6/3588; G02B 6/12004; G02B 6/2813; G02B 6/34; G02B 6/29344; G02F 1/0136
See application file for complete search history.

(56) References Cited

U.S. PATENT DOCUMENTS 4,635,482 A * 1/1987 Walker ................. G01P 15/093
356/483
4,960,319 A 10/1990 Dankowych
(Continued)

FOREIGN PATENT DOCUMENTS

CN    105676483 A   6/2016
EP      2629102 A2   8/2013
(Continued)

OTHER PUBLICATIONS

Caspers, et al., "Active Polarization Independent Coupling to Silicon Photonics Circuit," SPIE Photonics Europe, p. 9133-17 (2014).
(Continued)

*Primary Examiner* — Akm E Ullah

(57) ABSTRACT

A photonic device such as a polarization controller includes a coupler, such as a 2×2 MMI coupler, or a series of such couplers. Couplers may be interspersed with other components such as phase shifters. Photodetectors such as photodiodes are coupled to input and output lines of the coupler or couplers, for example via taps. In various embodiments, all of the couplers include photodetectors monitoring light power for at least two of their inputs and outputs, and at least one of the couplers includes photodetectors monitoring at least three of its inputs and outputs. The arrangement of photodetectors can provide sufficient information for feedback control of the photonic device and/or determining the state of polarization of light within the photonic device. Signals from some photodetectors can be used to estimate light power at locations in the photonic device lacking photodetectors.

25 Claims, 8 Drawing Sheets

(51) Int. Cl.
*G02B 6/27* (2006.01)
*G02B 6/28* (2006.01)
*G02F 1/01* (2006.01)

(52) U.S. Cl.
CPC ......... *G02B 6/2773* (2013.01); *G02B 6/2813* (2013.01); *G02B 6/2852* (2013.01); *G02F 1/0136* (2013.01); *G02B 6/272* (2013.01); *G02B 6/2793* (2013.01); *G02B 2006/12142* (2013.01); *G02B 2006/12147* (2013.01)

(56) References Cited

U.S. PATENT DOCUMENTS

| | | | | |
|---|---|---|---|---|
| 6,363,186 | B1* | 3/2002 | Popelek | G02B 6/29362 385/18 |
| 6,614,213 | B1* | 9/2003 | Whitbread | G01J 1/42 324/72 |
| 6,853,758 | B2* | 2/2005 | Ridgway | G02F 1/0136 359/245 |
| 7,417,718 | B2* | 8/2008 | Wada | G01S 7/493 356/5.01 |
| 9,014,565 | B2* | 4/2015 | Sangawa | H04R 23/008 398/132 |
| 9,069,194 | B2* | 6/2015 | Onishi | G02F 1/0136 |
| 9,417,267 | B2* | 8/2016 | Dorner | G01R 15/246 |
| 2004/0008916 | A1 | 1/2004 | Ridgeway et al. | |
| 2006/0023987 | A1 | 2/2006 | Yao | |
| 2007/0230882 | A1* | 10/2007 | Hainberger | G02F 1/0136 385/122 |
| 2008/0030839 | A1* | 2/2008 | Yao | G02F 1/0136 359/281 |
| 2013/0234698 | A1 | 9/2013 | Dorner | |
| 2014/0126855 | A1 | 5/2014 | Onishi | |
| 2014/0299743 | A1 | 10/2014 | Miller | |
| 2016/0313505 | A1* | 10/2016 | Ma | G02B 6/34 |

FOREIGN PATENT DOCUMENTS

| | | |
|---|---|---|
| JP | H05313109 A | 11/1993 |
| JP | 1993-313109 A | 6/1995 |
| WO | 2015176311 A1 | 11/2015 |

OTHER PUBLICATIONS

C. R. Doerr and L. Chen, "Monolithic PDM-DQPSK Receiver in Silicon," ECOC (2010), p. PD 3.6.

Sacher, et al., Polarization Rotator-splitters and Controllers in a Si3N4-on-SOI Integrated Photonics Platform, Optics Express, 22(9), 11167, 2014.

Heismann et al., "Polarization-Independent Photonic Switching System Using Fast Automatic Polarization Controllers", IEEE Photonic Technology Letters,, vol. 5, No. 11, p. 1341, Nov. 1993.

L. Moller, "WDM Polarization Controller in PLC Technology", IEEE Photonic Technology Letters, vol. 13, No. 6, Jun. 2001.

Madson, et al, "Reset-Free Integrated Polarization Controller Using Phase Shifters" IEEE J. of Selected Topics in Quantum Electronics, vol. 11, No. 2, p. 431-438, Mar./Apr. 2005.

Koch et al, "Versatile Endless Optical Polarization Controller/tracker/demultiplexer", Optics Express, vol. 22, No. 7, p. 8259-8576, Apr. 7, 2014.

Martinelli et al., "Polarization Stabilization in Optical Communications Systems", Journal of Lightwave Technology, vol. 24, No. 11, p. 4172-4183, Nov. 2006.

Walker et al., "Polarization Control for Coherent Communications", Journal of Lightwave Technology, vol. 8, No. 3., p. 438-458, Mar. 1990.

U.S. Appl. No. 15/067,798, "Polarization Control for a Photonic Platform", filed Mar. 11, 2016 (not yet published).

U.S. Appl. No. 15/087,449, "Automatic Endless Polarization Controller for a Silicon-On-Insulator Platform", filed Mar. 31, 2016 (not yet published).

International Search Report dated Jun. 6, 2017 and completed on May 22, 2017, corresponding to International Patent Application No. PCT/CN2016/03259 filed Oct. 25, 2016.

* cited by examiner

METHOD AND APPARATUS FOR OBTAINING OPTICAL MEASUREMENTS AT AN OPTICAL COUPLER HAVING TWO INPUTS AND TWO OUTPUTS

FIELD OF THE INVENTION

The present invention pertains to the field of photonic systems and in particular to a method and apparatus for obtaining optical measurements, for example related to state of polarization of light, in a photonic device.

BACKGROUND

Certain photonic devices such as photonic integrated circuits (PICs) typically operate best when the incoming light signals have a particular state of polarization (SOP), for example the transverse-electric (TE) SOP. However, in practice the incoming light may have a different SOP (e.g. due to random polarization). Polarization controllers may be employed for dynamically regulating the SOP of incoming light. Polarization control is desirable in various situations in which a sensitivity to polarization of light exists. For example, receivers of coherent engines, modulators, certain types of fibers such as OAM fibers, and silicon photonic devices, may be particularly sensitive to polarization. The use of silicon photonics in datacenters may particularly benefit from controlling the SOP of incoming light.

Like other control schemes, polarization control can be implemented using feedback, in which control signals are adjusted based on a monitored SOP. However, currently available schemes for measuring SOP can be complex, which leads to implementation problems of cost, scalability, component count, insertion loss, and device size. Current SOP measurement schemes impose significant costs to photonic architectures which limits applications when scalability is required. It is also difficult to simplify the SOP measurement schemes without significantly increasing the complexity of the associated measurement and control algorithms.

In addition to polarization controllers, other photonic devices may also benefit from photonic measurements, such as measurements indicative of or related to SOP, or measurements which can be used for feedback control or device monitoring.

Therefore there is a need for a method and apparatus for obtaining efficient optical measurements in a photonic device that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for obtaining optical measurements in a photonic device. In accordance with an embodiment of the present invention, there is provided a photonic device, such as but not necessarily limited to a polarization controller. The photonic device includes a 2×2 optical coupler which has two optical inputs and two optical outputs, for a total of four inputs and outputs. Three photodetectors are coupled to each of three (of the total of four) inputs and outputs of the optical coupler. The photodetectors may be coupled via optical tap to their respective inputs and outputs. In some embodiments, a known component such as a phase shifter is located between the photodetector and the associated input or output of the optical coupler. The photodetectors are each configured to provide a signal indicative of power of light measured at their respective location. A processing section is provided which is configured to receive the signals provided by the plurality of photodetectors. The processing section is configured to process the received signals, and may generate control signals, for example for controlling the photonic device by controlling phase shifters thereof.

In some embodiments, the photonic device includes a further 2×2 optical coupler connected in series with the coupler. The further 2×2 optical coupler includes two further inputs and two further outputs for a total of four further inputs and outputs. A pair of further photodetectors is coupled to two of the four further inputs and outputs of the further coupler. The further photodetectors also provide signals indicative of power of light to the processing section. To avoid duplication, and where possible, one of the three photodetectors of the first optical coupler is also one of the pair of further photodetectors. The processing section is configured to estimate power of light at one of the further inputs and outputs of the further optical coupler, based on measurements provided by the three photodetectors and by the pair of further photodetectors. This may involve intermediate estimation of power of light at other unmeasured inputs or outputs.

In accordance with another embodiment of the present invention, there is provided a measurement device integrated into a photonic device. The photonic device has a 2×2 optical coupler having two inputs and two outputs making a total of four inputs and outputs. The measurement device includes a plurality of photodetectors coupled (e.g. directly or via an intermediate component such as a phase shifter) to three of the four inputs and outputs of the 2×2 optical coupler. The photodetectors are configured to provide signals indicative of power of light at each of the three of the four inputs and outputs. A processing section operatively coupled to the photonic device is configured to receive the signals provided by the plurality of photodetectors.

In accordance with another embodiment of the present invention, there is provided a method for obtaining optical measurements in a photonic device, the photonic device having a coupler having two inputs and two outputs making a total of four inputs and outputs. The method includes measuring power of light at a plurality of photodetectors each optically coupled to a respective one of three of the four inputs and outputs of the coupler. The method further includes providing signals indicative of power of light at each of the three of the four inputs and outputs to a processing section operatively coupled to the photonic device. In some embodiments, the photonic device is a polarization controller, and the method further includes generating, by the processing section, control signals for one or more phase shifters of the polarization controller.

In some embodiments, the method further includes generating, by the processing section, an estimate of power of light at an input or output of the coupler other than said three of the four inputs and outputs. In some embodiments, the photonic device further comprises a further coupler connected in series with the coupler, the further coupler having two further inputs and two further outputs making a total of four further inputs and outputs. In these embodiments, the method further includes measuring power of light at a further plurality of photodetectors each optically coupled to a respective one of two of the four further inputs and outputs of the further coupler. The method further includes providing signals indicative of power of light at each of the two of the four further inputs and outputs to the processing section. The method further includes generating, by the processing section, estimates of power of light at one or more of the further inputs or outputs other than said two of the four further inputs and outputs.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
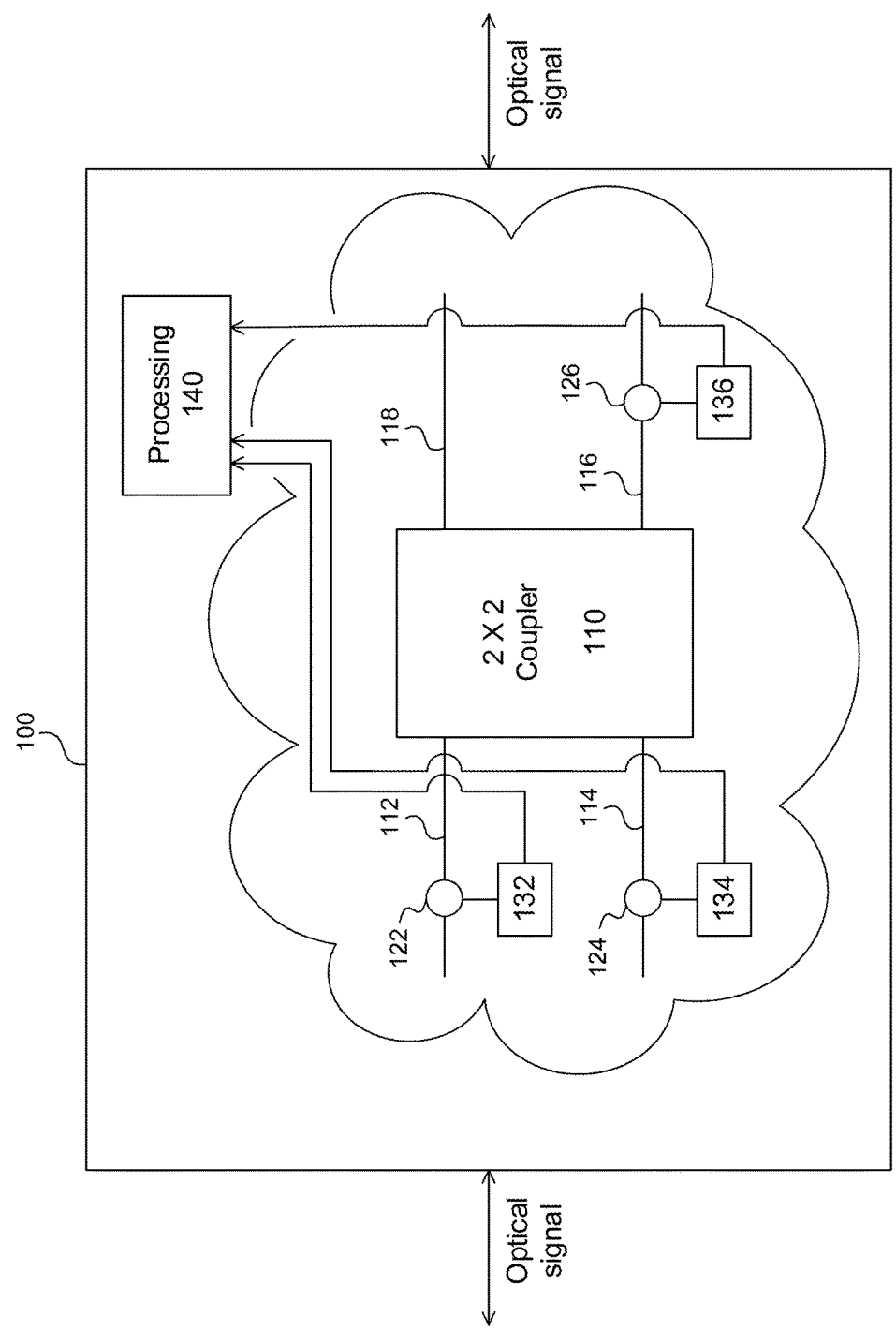
FIG. 1 illustrates an optical measurement apparatus in accordance with an embodiment of the present invention.

As used herein, the term "coupler" refers to an optical coupler, that is, a device which couples, mixes and/or splits optical signals. A coupler having N inputs and M outputs is referred to as an N×M coupler. The 2×2 coupler (i.e. having N=M=2) is referred to extensively herein. A coupler may alternatively be referred to as a mixer or optical coupler. A coupler may be a multimode interference (MMI) coupler, for example, such as a 3 dB MMI coupler. A coupler may be a 50/50 directional coupler. Alternative couplers, such as evanescent couplers, may also be used in some embodiments.

Datacenters may include one or more optical networks or optical portions of a larger network that include silicon-based photonic components. Generally, optical transceivers used in datacenters are non-coherent where the information is not coded in the polarization, i.e., polarization dimension is not used for carrying data traffic. Silicon photonic components, such as photonic switches, may operate optimally with a particular linear polarization of light, such as transverse-electric (TE) polarization. The silicon photonics may incur additional losses when operating with non-TE polarizations of incoming light. A state of polarization (SOP) controller may therefore be used to convert a random polarization of incoming light to a linear polarization, such as TE polarization. Some embodiments of the present invention relate to an improved design for such a polarization controller, in particular in which optical measurements used for feedback control are more effectively obtained. This design paradigm can also be used in other photonic devices, and/or in applications other than datacenters. For example, the present invention can be implemented in photonic devices, for example located in a photonic integrated circuit incorporating a coupler in which real-time measurements of phase and/or polarization of signals is desired.

Embodiments of the present invention provide for a photonic device, such as a polarization controller, having an integrated set of photodetectors. The photonic device includes at least one coupler, and the photodetectors are coupled to inputs and outputs of the coupler in order to provide signals indicative of power of light at those inputs and outputs. Typically the coupler is a 2×2 coupler, with the photodetectors located at three of the four inputs and outputs thereof. The signals output by the photodetector are provided to a processing section of the photonic device. The processing section may be an electronics section, microcontroller, or the like. The processing section may be configured as a controller for feedback control of the photonic device, with the output of the photodetectors providing feedback for use by the controller.

The above-described arrangement of photodetectors coupled to inputs and outputs of a coupler within a photonic device provides for a relatively simple, scalable and efficient apparatus usable for providing information on the state of light, for controlling photonic devices such as polarization controllers. This arrangement may be used instead of a separate, potentially complex device for determining the state of polarization of light. Notably, the coupler of the photonic device performs a dual function. First, the coupler performs an intended function within the photonic device itself; the coupler mixes, splits, or otherwise manipulates optical signals in a predetermined way in order to support a given functionality of the device. Second, the coupler outputs optical signals which depend on multiple input signals in a known way, thereby establishing a known relationship between its input and output optical signals. By measuring the power of the input and output signals (using multiple photodetectors) and using the known relationship, information on the relative phase relationship between the input signals can be obtained. This information can be used to generate control signals, for example.

For example, the 2×2 coupler mixes its two input signals such that each output varies with the phase difference between the input signals. In various embodiments, and as will be readily understood by a worker skilled in the art, an ideal 50/50 2×2 coupler divides power presented at each of its two inputs equally and routes half of the input power to a first output and half of the input power to a second output. Such a 2×2 coupler also imparts a 90 degree phase shift to the optical signal routed from the top input to the bottom output or from the bottom input to the top output of the coupler. Thus, operation of such a 2×2 coupler can be expressed in terms of its transfer function:

$$H_{coupler} = \frac{1}{\sqrt{2}}\begin{bmatrix} 1 & j \\ j & 1 \end{bmatrix} \quad (1)$$

In other embodiments, different types of 2×2 couplers may be used, for example in which the power is divided unequally or other predetermined phase shifts are applied for some inputs at some outputs, or a combination thereof. Thus the transfer function of Equation (1) can be varied in several ways, by adjusting the design of the coupler, which is typically a passive component. If the coupler is an active component for which the transfer function can be varied, changes to the transfer function may be taken into account when performing optical measurements as described herein.

Embodiments of the present invention are capable of providing sufficient information for feedback control of a polarization controller using substantially limited number of components and photodetectors and relatively simple processing electronics receiving signals from the photodetectors. Insertion loss is therefore limited, because only limited amount of optical signal is consumed by the photodetectors.

Embodiments of the present invention are particularly applicable to polarization controllers. The polarization controller receives an incoming optical signal, which may comprise randomly polarized light, and adjusts the light to a desired polarization. Adjustments may be performed using phase shifters applied to orthogonal components of the light, for example, as would be readily understood by a worker skilled in the art. The polarization controller also comprises one or more couplers which mix the light after phase shifts are applied. The amount of phase shift to apply depends on the current state of polarization of the light. The photodetector arrangement provides for the collection of information which is related to the current state of polarization of the light, and which can be used to control the amount of phase shift applied, without necessarily having to determine state of polarization.

Embodiments of the present invention provide for an improved approach to photodetector placement in photonic devices such as polarization controllers. Rather than providing sophisticated state of polarization measurement modules and attempting to operate the polarization controller based on the state of polarization for each individual input to the corresponding device, photodetectors are placed at strategic locations within the photonic device in order to obtain a number of measurements which are sufficient for a desired purpose, such as feedback control. Full and explicit measurement of the state of polarization of the incoming lightwave signal may not be necessary and relevant for control purposes, although it may be determined at least approximately from the obtained measurements, if desired. For example, the state of polarization at the input to the photonic device may be estimated in some embodiments. However, in various embodiments, the determination of state of polarization may be unnecessary and omitted. State of polarization can be indicated for example by providing values for Stokes parameters S0, S1, S2, S3, as would be readily understood by a worker skilled in the art. The state of polarization may be different at different locations within the photonic device.

Embodiments of the present invention comprise the use of photodetectors placed at predetermined locations within a light-manipulating device such as a polarization controller, the photodetectors monitoring power of light at the predetermined locations and providing signals for use in feedback control of the device. For example, rather than operating a polarization controller based on the state of polarization of light at the input or output of the controller, the polarization controller may be operated based on measured characteristics of light at certain intermediate locations within the polarization controller. Because measurements are made at intermediate locations, individual portions (such as individual phase shifters) at different stages of the polarization controller can be controlled more readily with more accurate and proper data.

Potential advantages of the photodetector arrangement described herein include: simplicity of design and architecture, limited number of components, limited component size, limited power consumption, and limited insertion loss. The simplicity and limited number of components in the photodetector arrangement facilitates scalability when large numbers of polarization controllers or other devices are required, for example in a practical photonic integrated circuit with high number of input ports feeding optical signals from different sources. The requirement to carefully match multiple optical paths in order to control interference patterns is also avoided. The present invention may be used as an alternative to existing methods which rely on phase detection to determine state of polarization, in which monitoring signals are mixed in order to detect a beat signal.

Embodiments of the present invention provide a close integration of optical measurement with operation of the photonic device in which the photodetectors are placed. For example, it is recognized herein that, to adequately control state of polarization of light, a full explicit SOP measurement is unnecessary. Rather, it is adequate to measure the phase of signals at the inputs and/or outputs of the various phase shifters of the polarization controller. Couplers provide a convenient location at which to tap such signals.

Consequently, interpretation of a photodetector's measurements is directly related to the photodetector's location and the host device architecture. Data correlation can be used to extract desired parameters. The information to be extracted (such as information used in generating feedback control signals) may be generated in a manner which is based on the host photonic device architecture and functionality. Embodiments of the present invention include photodetectors placed internally to the photonic device, which provide information regarding the state of optical signals internally to the host photonic device. This allows for relatively simple and efficient control schemes to be employed for controlling the photonic device. Because a separate, self-contained SOP measurement module is omitted, cost and complexity are limited while maintaining desired performance.

In some embodiments, extracting parameters using data correlation may be performed based on the known properties of the directional couplers used in the photonic device (e.g. using mathematical models). The models may express how light is treated by the directional couplers, for example by applying an insertion loss. For example, a 50% insertion loss may be modeled for a 2×2 directional coupler. The power measured by the photodetectors can be used to derive readings for use in controlling the host device, for example for controlling phase shifters of the polarization controller. The tap loss associated with routing part of the light to the photodetectors can also be incorporated into the models.

Embodiments of the present invention provide for a measurement device integrated into a host photonic device. The host photonic device may be, for example, a polarization controller, while the measurement device includes photodetectors integrated into the host photonic device for measuring properties of optical signals at strategic points in the host photonic device. The photonic device includes at least one coupler, such as a 2×2 coupler, and the measurement device includes a plurality of photodetectors which are coupled to all but one of the inputs and outputs of the coupler. The photodetectors measure power of light at the inputs and outputs and to provide signals indicative of same to a processing section.

Embodiments of the present invention provide for a method for obtaining optical measurements in a photonic device. The photonic device includes a coupler, such as a 2×2 coupler. The method includes measuring power of light at a plurality of photodetectors each optically coupled to a respective one of all but one of the inputs and outputs of the coupler. The method further includes providing signals indicative of power of light, at each of the measured inputs and outputs, to a processing section operatively coupled to the photonic device. The method may further include processing the signals to generate control signals, SOP information, or the like, or a combination thereof.

It is recognized herein that for a 2×2 coupler, such as an MMI coupler, within a device such as a polarization controller, measuring power of light at three of the four inputs and outputs can, in many situations, provide sufficient information for feedback control and/or state of polarization tracking. Furthermore, a standard design of polarization controllers or SOP trackers is to use multiple (e.g. 2 to 5) serially-connected stages, each including a 2×2 coupler and one or more phase shifters. Therefore, at each stage of the device, measurements or estimates of power of light at three inputs and outputs of the 2×2 coupler at that stage can be used to obtain desired information on the state of polarization of light within that stage. The topological distribution of the photodetectors can be customized to the architecture of the host device.

FIG. 1 illustrates optical measurement according to an embodiment of the present invention. A photonic device 100 having a coupler 110 is shown. The device 100 may be part of a polarization controller. A portion of the device 100 including the coupler 110 is illustrated, with other portions, such as phase shifters, polarization rotator-splitters, and additional couplers, not shown for purposes of clarity. The coupler 110 is illustrated as a 2×2 coupler having four optical lines 112, 114, 116, 118 connected thereto. If optical signals flow from left to right, the optical lines 112, 114 are input lines (to the coupler) while the optical lines 116, 118 are output lines. If optical signals flow from right to left, the optical lines 116, 118 are input lines while the optical lines 112, 114 are output lines. A measurement device is integrated with the device 100 and comprises a plurality of taps 122, 124, 126 and a plurality of photodetectors 132, 134, 136. The taps 122, 124, 126 are coupled to the optical lines 112, 114, 116, respectively. Each tap 122, 124, 126 couples a limited amount (e.g. 1%, 2% or less than 5%) of optical signal to a corresponding one of the photodetectors 132, 134, 136, via an optical path (e.g. optical transmission line or waveguide). Each photodetector 132, 134, 136 outputs a signal, such as an electrical signal, indicative of the power of light incident thereon. The photodetectors may be photodiodes, for example. The signals output by the photodetectors may be provided to a processing section 140 comprising a controller, a microprocessor, analog or digital electronics, or the like, or a combination thereof, as mentioned above. The signals may be processed by the processing section 140. In some embodiments, the processing section 140 may further provide information or control signals for use in feedback control of one or more components of the device 100, such as phase shifters (not shown in FIG. 1). Alternatively, the processing section 140 may provide information to a separate controller (not shown). Additionally or alternatively, the signals may be processed by the processing section 140 to provide information on the state of polarization of light as it passes through the coupler 110.

The coupler 110 forms part of the device 100 and is used to mix optical signals in a fixed manner, as part of the operation of the device 100. However, the mixing of the optical signals by the coupler 110 also aids in providing a combination of interdependent signals to the photodetectors 132, 134, 136 which are useful for a given purpose, such as feedback control of other components of the device 100 (not shown) and/or determining state of polarization.

Figure 2:
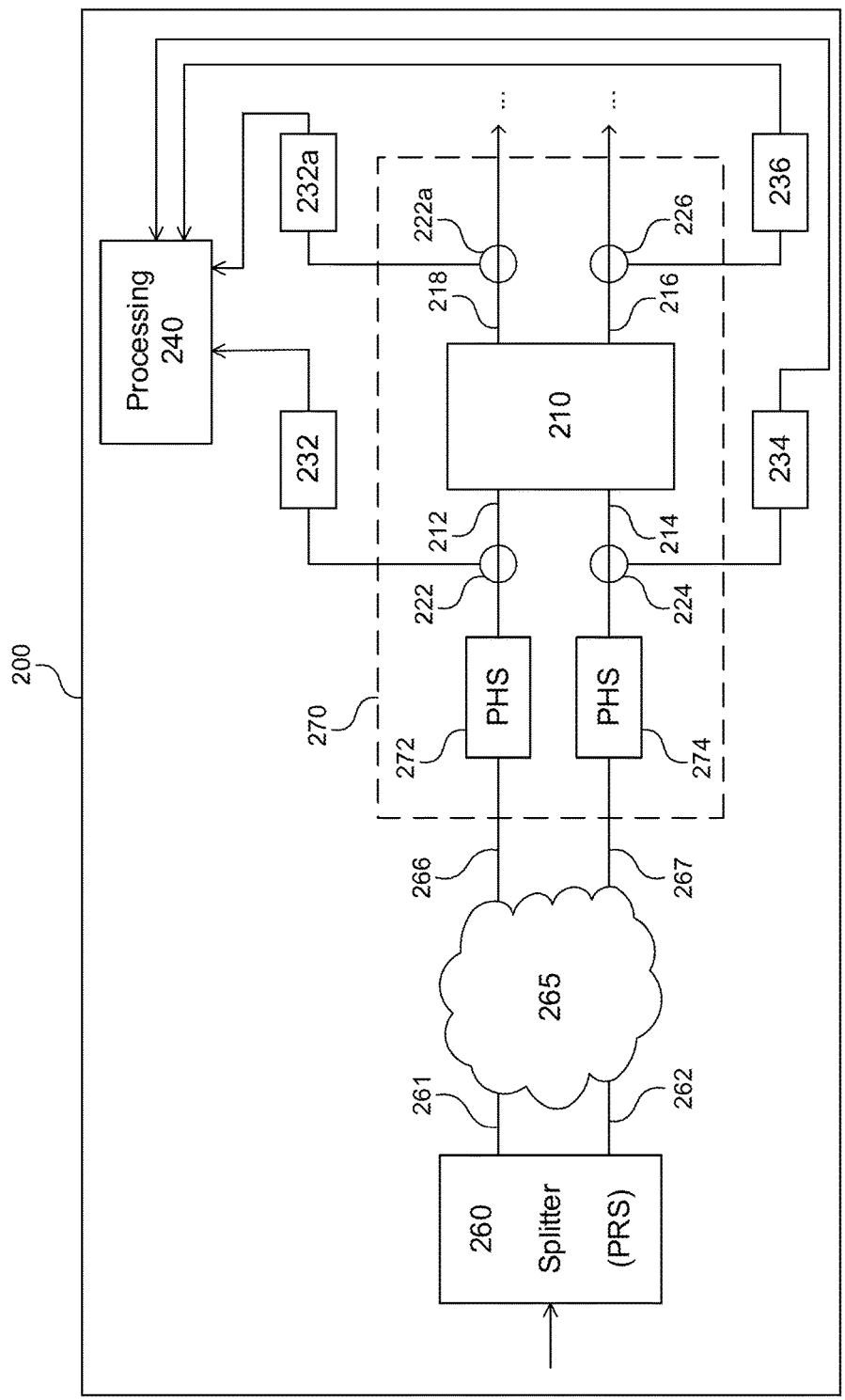
FIG. 2 illustrates an optical measurement apparatus in accordance with another embodiment of the present invention.

FIG. 2 illustrates optical measurement according to another embodiment of the present invention. In particular, the device 200 of FIG. 2 includes more details than are illustrated in the device 100 of FIG. 1. The device 200, which may be a polarization controller, includes a beam splitter 260 which splits an incoming optical signal into two components 261, 262, such as orthogonal components. The beam splitter 260 may be a polarization rotator-splitter. The device possibly further includes an optional intermediate section 265 which receives the two component signals provided by the beam splitter, operates on the two component signals and provides two further component signals 266, 267 to a functional block 270 containing an optical coupler 210. The component signals on parallel branches of the device correspond typically to the orthogonal components of incoming optical signal. The functional block 270 also includes phase shifters 272, 274. Alternatively, one of the phase shifters 272, 274 may be omitted. The functional block 270 may operate as part of a Mach-Zehnder Interferometer (MZI) comprising a phase shifter interposed between a pair of couplers. The intermediate section 265 may be a prior stage having a similar configuration to the functional block 270. As with FIG. 1, the coupler 210 is illustrated as a 2×2 coupler having four optical lines 212, 214, 216, 218 connected thereto.

A measurement device of FIG. 2 comprises a plurality of taps 222, 224, 226 and a plurality of photodetectors 232, 234, 236. The taps 222, 224, 226 are coupled to the optical lines 212, 214, 216, respectively. Each tap 222, 224, 226 couples a limited amount of optical signal to a corresponding one of the photodetectors 232, 234, 236, via an optical path. Each photodetector 232, 234, 236 outputs a signal, such as an electrical signal, indicative of the power of light incident thereon. FIG. 2 illustrates an alternative tap 222a and corresponding alternative photodetector 232a that can be used in place of tap 222 and photodetector 232. More generally, taps may be provided at any three of the four locations 222, 222a, 224, 226, along with three corresponding ones of the photodetectors 232, 232a, 234, 236 neglecting the direction of the incoming signal. Signals from the photodetectors are provided to a processing section 240. For FIG. 2 it is assumed that the signal is coming from left to the right.

Figure 3:
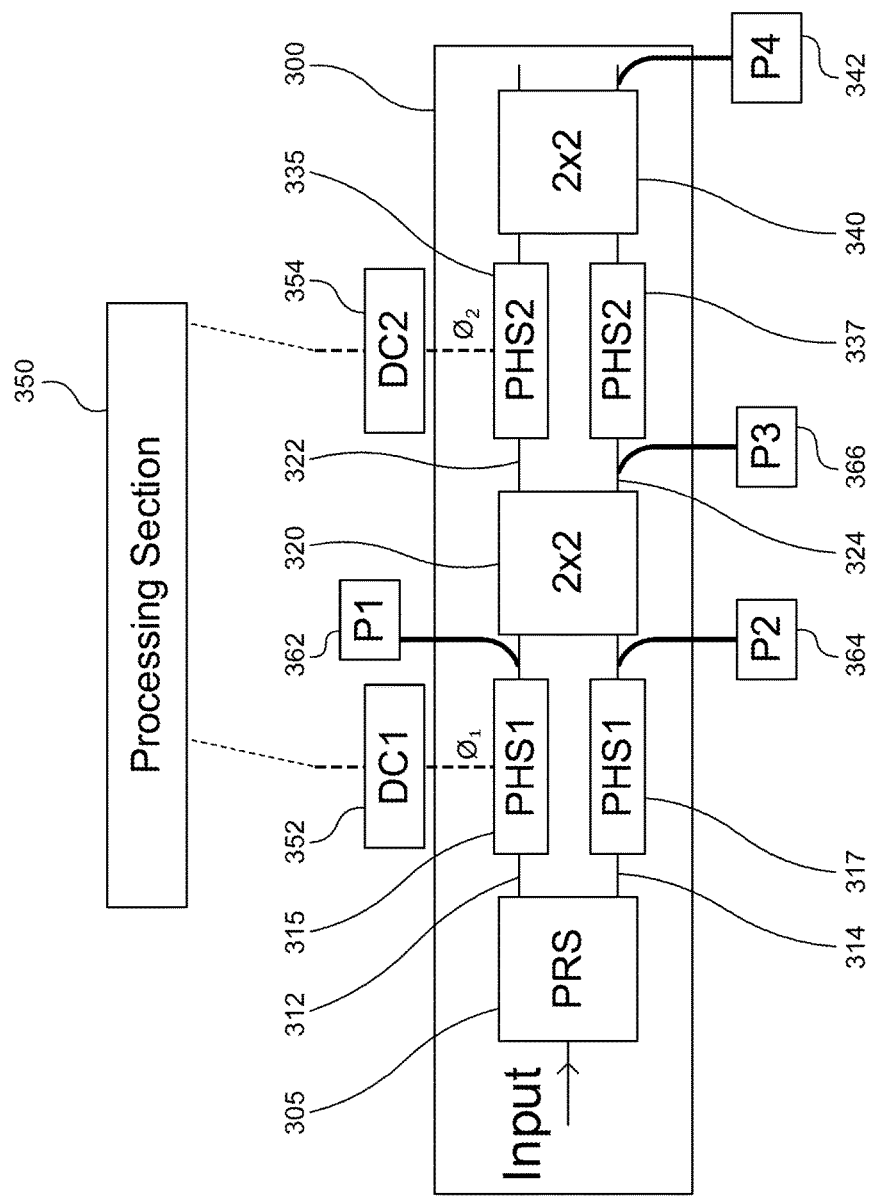
FIG. 3 illustrates a two-stage polarization controller incorporating optical measurement, in accordance with an embodiment of the present invention.

FIG. 3 illustrates a two-stage polarization controller comprising a measurement device, according to another embodiment of the present invention. Aspects of the polarization controller, without the measurement device, can be understood with reference to U.S. patent application Ser. No. 15/067,798, filed Mar. 11, 2016, which is hereby incorporated by reference.

FIG. 3 illustrates a polarization controller comprising a polarization rotator-splitter (PRS) 305 configured to receive input light having first and second orthogonal polarization components and to split and rotate the input light into first and second feeds 312, 314 corresponding to the first and second orthogonal polarization components, respectively.

The polarization controller 300 includes a first phase shifter (PHS1) 315, 317 for providing a first optical (relative) phase delay $\varphi_1$ between the first and second feeds 312, 314 based on a first control signal DC1 352 (such as a direct current control signal). The phase-shifted first and second feeds are then provided to a first 2×2 multi-mode interference (MMI) coupler 320 which mixes the first and second feeds 312, 314 having the first optical phase delay therebetween, to provide third and fourth feeds 322, 324 at the output of the coupler 320.

The polarization controller 300 includes a second phase shifter (PHS2) 335, 337 for providing a second optical phase delay between the third and fourth feeds 322, 324 based on a second control signal DC2 354 (such as a direct current control signal). The phase-shifted third and fourth feeds 322, 324 are then provided to a second 2×2 multi-mode interference (MMI) coupler 340 which mixes the third and fourth feeds 322, 324 having the second optical phase delay therebetween.

The measurement device comprises three photodetectors P1 362, P2 364 and P3 366 coupled to the phase-shifted first and second feeds and to the fourth feed 324. The photodetectors 362, 364, 366 provide signals indicative of power of light detected thereby to a processing section 350, which in turn generates and provides the control signals 352, 354. An optional photodetector P4 342 is also illustrated, which may be used for different purposes for example as described in U.S. patent application Ser. No. 15/067,798. The photodetectors are coupled to the feeds via taps which receive and redirect a portion of the signal on the feeds to the photodetectors.

In FIG. 3, input light can be represented by:

$$\begin{bmatrix} E_x \\ E_y \end{bmatrix} = \begin{bmatrix} E_{x_0} e^{j\varphi_x} \\ E_{y_0} e^{j\varphi_y} \end{bmatrix} \tag{2}$$

The polarization rotator-splitter 305 causes light component $E_x$ to propagate on the upper feed 312 and light component $E_y$ to propagate on the lower feed 314. The phase shifter PHS1 315, 317 causes the light component on the upper feed to be shifted in phase relative to the light component of the lower feed by a total of $\varphi_1$ degrees. Photodetectors measure the same power of light regardless of phase shifts being applied. The signal output by the first photodetector P1 362 at the top feed input to the 3 dB coupler can be indicative of a power value $P_1=|E_{x_0}|^2$, while the signal output by the second photodetector P2 364 at the bottom feed input to the 3 dB coupler can be indicative of a power value $P_2=|E_{y_0}|^2$. The photodetectors output a signal, for example as an electrical current, which is indicative of detected power according to a predetermined behaviour of the photodetector. The correlation between the photodetector signal and its indicated power value can be performed by the processing section 350.

The processing section can also apply a scaling factor to generate an indication of the power of light on the feed given that a known proportion of light is tapped from the feed to the photodetector. For example, if the tap redirects x percent of light on the feed to the photodetector, then a scaling factor of 100/x can be applied to determine the power of light immediately prior to the tap, and the power of light immediately after the tap can be determined similarly. It is assumed herein that such scaling has been performed or accounted for, e.g. by the processing section, so that power values P1, P2 and P3 represent power of light at the inputs and outputs of the coupler, rather than at the photodetector.

Although various embodiments of the invention illustrate pairs of phase shifters (e.g. PHS1 315, 317) on two parallel feeds of the circuit, it should be noted that in some embodiments one of the two phase shifters may be omitted. In either case, the phase shifter controllably adjusts the phase difference between a pair of input signals and provides the phase-adjusted input signals as a pair of output signals.

Furthermore, although photodetectors are, for simplicity, considered herein to provide a power value equal to the mean-squared amplitude of the light signal, photodetectors can in practice be calibrated to output a signal indicative of light power in various ways. The processing section may be used to translate the signals provided by the photodetectors to a desired form.

The 2×2 coupler 320 in FIG. 3 is illustrated as a 3 dB MMI coupler. The transfer function matrix H of the phase shifter PHS1 in series with the 3 dB MMI coupler is given by:

$$H = \frac{1}{\sqrt{2}} \begin{bmatrix} 1 & j \\ j & 1 \end{bmatrix} \begin{bmatrix} e^{j\varphi_1} & 0 \\ 0 & 1 \end{bmatrix} \tag{3}$$

$$= \frac{1}{\sqrt{2}} \begin{bmatrix} e^{j\varphi_1} & j \\ je^{j\varphi_1} & 1 \end{bmatrix} \tag{4}$$

Here, $\varphi_1$ is the relative phase difference between the upper and lower feeds as applied by the phase shifter.

Applying the transfer function H to the output of the PRS 305 gives:

$$\frac{1}{\sqrt{2}} \begin{bmatrix} e^{j\varphi_1} & j \\ je^{j\varphi_1} & 1 \end{bmatrix} \begin{bmatrix} E_{x_0} e^{j\varphi_x} \\ E_{y_0} e^{j\varphi_y} \end{bmatrix} \tag{5}$$

$$= \frac{1}{\sqrt{2}} \begin{bmatrix} E_{x_0} e^{j(\varphi_x+\varphi_1)} + E_{y_0} e^{j(\varphi_y+\pi/2)} \\ E_{x_0} e^{j(\varphi_x+\varphi_1+\pi/2)} + E_{y_0} e^{j\varphi_y} \end{bmatrix} \tag{6}$$

The lower row of (6) gives the output at the bottom of the 3 dB MMI coupler 320, corresponding to the location of third photodetector 366. The signal output by the third photodetector P3 366 can be indicative of a power value $P_3$, which is equal to the square magnitude of the lower row of (6), namely:

$$P_3 = \frac{1}{2}\left[|E_{x_0}|^2 + |E_{y_0}|^2 + 2|E_{x_0}||E_{y_0}|\cos\left(\varphi_{yx} - \varphi_1 - \frac{\pi}{2}\right)\right] \tag{7}$$

Equation (7) can also be expressed as:

$$P_3 = \frac{1}{2}[P_1 + P_2 + 2|E_{x_0}||E_{y_0}|\sin(\varphi_1 - \varphi_{yx})]. \tag{7a}$$

Notably, $P_3$ varies with the difference between the phase shift $\varphi_1$ applied by the phase shifter $\varphi_1$ and the phase angle $\varphi_{yx}=\varphi_y-\varphi_x$. This is due to the fact that the 2×2 coupler provides an output, at the third photodetector 366, which corresponds to an interference pattern between the input signals at the first and second photodetectors 362, 364.

Therefore, both magnitude and phase angle information can be obtained by use of the three photodetectors measurements, i.e. $P_1$, $P_2$, and $P_3$.

In view of the above, a method for operating the polarization controller as illustrated in FIG. 3 is described as follows. The polarization controller includes two controllable phase shifters PHS1 315, 317 and PHS2 335, 337. According to the method, the second phase shifter PHS2 can be controlled based on the power ratio between the components of the incoming light, that is the components $E_x$ and $E_y$. That is, PHS2 can be controlled based on the ratio between power values measured at the two inputs of the 2×2 coupler 320. In particular, The angle $PHS_2$ applied by the second phase shifter PHS2 335, 337 can be set according to:

$$PHS_2 = \text{arc } \tan(P_2/P_1) \qquad (8)$$

Furthermore, the first phase shifter PHS1 315, 317 can be controlled based on the phase difference between the components of the incoming light. In particular, the angle $PHS_1$ applied by the first phase shifter can be set according to:

$$PHS_1 = -\arcsin\left(\frac{2P_3 - P_1 - P_2}{2\sqrt{P_1 P_2}}\right) \qquad (9)$$

A method for operating the polarization controller of FIG. 3 therefore comprises obtaining measurements from the first, second and third photodetectors 362, 364, 366 coupled to the input and output lines of the 2×2 coupler 320. The method further comprises controlling the first phase shifter 315, 317 based on outputs of the photodetectors 362, 364, for example in accordance with Equation (9), and controlling the second phase shifter based on outputs of the three photodetectors 362, 364, 366, for example in accordance with Equation (8). This approach results in seamless state of polarization control, in which the polarization of light output from the polarization controller is substantially held to a desired polarization, such as a TE polarization. The method may further comprise generating an estimate of the power of light at the unmeasured input or output of the 2×2 coupler. This estimate may be generated as described below and used for further purposes.

Obtaining the measurements by the photodetectors can be performed repeatedly, for example on a periodic basis at a predetermined fixed or variable frequency. The computations can be performed using digital or analog circuits configured as would be readily understood by a person skilled in the art, or alternatively using a microprocessor executing program instructions to perform the computations. As another alternative, the phase shifter outputs can be pre-computed for multiple values of photodetector signals and stored in a lookup table. The phase shifters can then be controlled based on the photodetector signals via a lookup table operation.

A similar control method can be performed when the two of the photodetectors are coupled to outputs of the 2×2 coupler and one of the photodetectors is coupled to an input of the 2×2 coupler. For example, in this case, based on the signals provided by the three photodetectors, an estimate power of light at the unmeasured input line of the 2×2 coupler can be determined using the procedure described below. This estimate can then be used as the value of P1 or P2 in Equations (9) and (8) above, respectively. The computation circuitry, lookup table values or program instructions for performing the computations can be adjusted accordingly.

An estimate of the power of light at the fourth (unmeasured) line of the 2×2 coupler can be determined based on measurements $P_1$, $P_2$, $P_3$ and a conservation of power constraint reflecting that light input to the 2×2 coupler should approximately equal light output by the 2×2 coupler (neglecting losses). This estimate corresponds to a measurement that would be provided by a photodetector if it were coupled to this fourth line. The estimate of the power of light at the unmeasured line of the 2×2 coupler can be determined based on a model of the 2×2 coupler, for example based on numerical relationships describing properties of the 2×2 coupler (e.g. using the above-identified transfer function $H_{coupler}$ in Equation (1)). The model can be based on theory, observation, or a combination thereof. A microprocessor configured to perform numerical computations and/or retrieve data from lookup tables, or equivalent digital or analog circuitry, can be configured to generate the estimates based on the model.

For example, in FIG. 3, the data generated by photodetector P1 362 can be used to generate an estimate of the power at feed 312 prior to the phase shifter 315. The estimate can be generated based on knowledge of optical losses realized by the phase shifter 315, for example.

As another example, in FIG. 3, the data generated by photodetectors P1 362, P2 364 and P3 366 can be used to generate an estimate of power of light at the unmeasured line of the 2×2 coupler 320 as $P_1+P_2-P_3$ (for a symmetric coupler).

When generating estimates of power of light at a given point, optical losses can be accounted for based on design data, calibration data, or the like.

Figure 4:
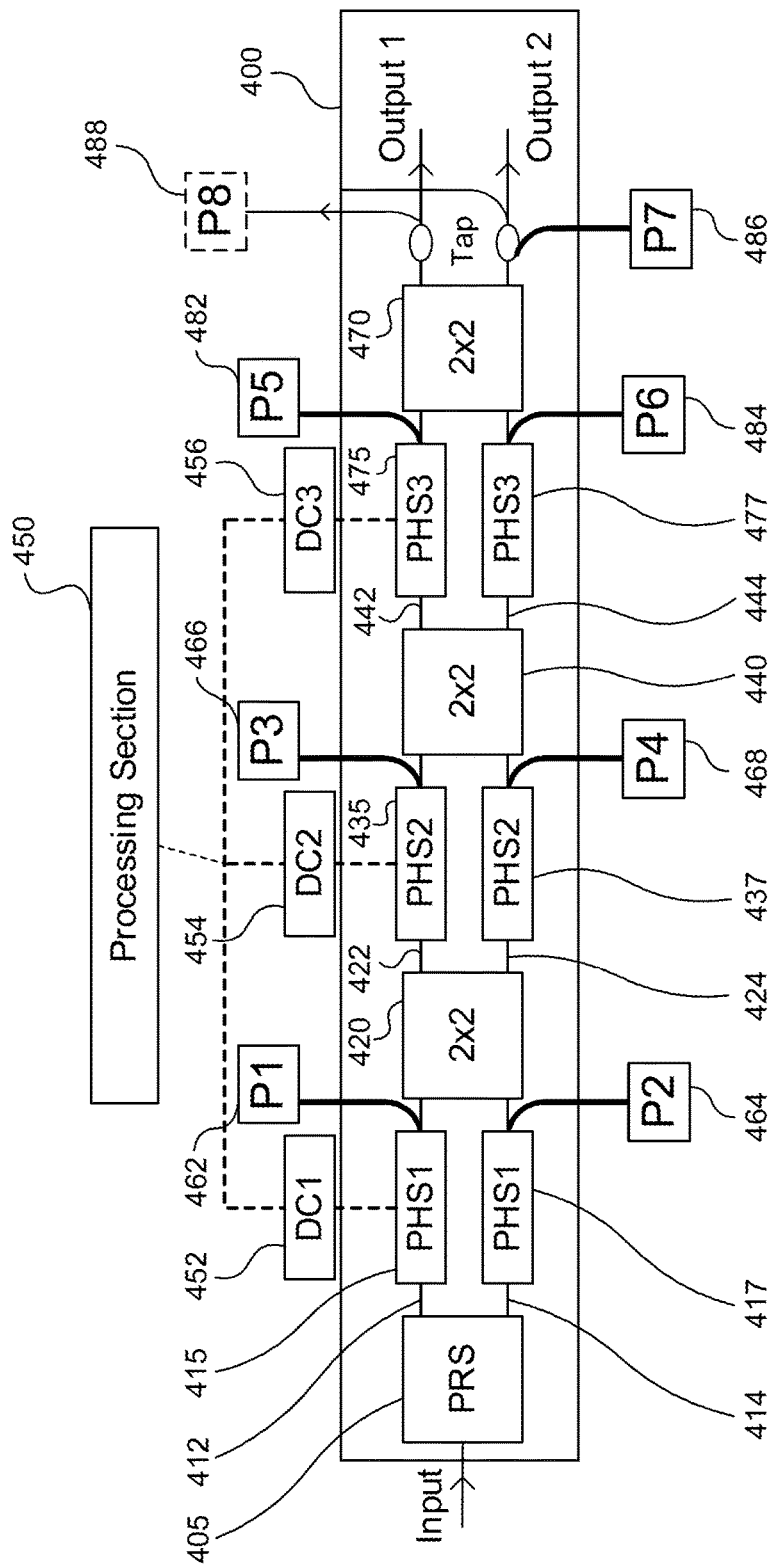
FIG. 4 illustrates a three-stage polarization controller incorporating optical measurement, in accordance with an embodiment of the present invention.

FIG. 4 illustrates a three-stage polarization controller 400 provided in accordance with an embodiment of the present invention. The polarization controller, without the optical measurement component, is described in detail in U.S. patent application Ser. No. 15/087,449, filed Mar. 31, 2016, which is hereby incorporated by reference. The polarization controller includes a polarization rotator-splitter 405, a first stage comprising a first controllable phase shifter PHS1 415, 417 and a first 2×2 coupler 420, a second stage comprising a second controllable phase shifter PHS2 435, 437 and a second 2×2 coupler 440, and a third stage comprising a third controllable phase shifter PHS3 475, 477 and a third 2×2 coupler 470. Seven photodetectors 462, 464, 466, 468, 482, 484, 486 are provided, such that the photodetectors are coupled to at least three of the inputs and outputs of each 2×2 coupler.

To be more specific, photodetector P1 462 is coupled to a first feed 412 from the PRS 405 following treatment by phase shifter 415, if applicable; photodetector P2 464 is coupled to a second feed 414 from the PRS 405 following treatment by phase shifter 417, if applicable; photodetector P3 466 is coupled to a third feed 422 from the coupler 420 following treatment by phase shifter 435, if applicable; photodetector P4 468 is coupled to a fourth feed 424 from the coupler 420 following treatment by phase shifter 437, if applicable; photodetector P5 482 is coupled to a fifth feed 442 from the coupler 440 following treatment by phase shifter 475, if applicable; photodetector P6 484 is coupled to a sixth feed 444 from the coupler 440 following treatment by phase shifter 477, if applicable; and photodetector P7 486 is coupled to an output of the coupler 470.

For completeness, a potential eighth photodetector 488 is also shown, coupled to another output of the coupler 470, the purpose of which will become clear below. Coupling in this sense means that the photodetector is connected, for example via a tap, to an optical transmission line connected to an input or output of the coupler. The optical transmission line (at the location of the tap) is either directly connected to the input or output or indirectly connected through a phase shifter component. The impact of a phase shifter component can be taken into account when determining power of light, for example by setting the scaling factor used for processing the readings from the detectors.

As illustrated, photodetectors are coupled to each input of each 2×2 coupler and to at least one output of each 2×2 coupler. When an optical line attached to a coupler includes a phase shifter, the photodetector can be provided on either side of the phase shifter, provided that losses introduced by the phase shifter are compensated for when interpreting the signals provided by the photodetectors. The number of detectors can be further decreased by proper calibrations and/or having accurate modeling of components such as the 2×2 couplers and the response of phase shifters.

The photodetectors 462, 464, 466, 468, 482, 484, 486, 488 provide signals (not shown) to a processing section 450, which may be a feedback and controlling circuit. The processing section 450 controls the phase shifters based at least in part on the signals provided by the photodetectors. Each phase shifter may be adjusted based on signals provided by photodetectors connected at the inputs and outputs of the 2×2 coupler immediately downstream of that phase shifter. In one embodiment PHS1 is adjusted using controllable DC current DC1 452 based on measurements provided by photodetectors P1, P2 and P4, PHS2 is adjusted using controllable DC current DC2 454 based on measurements provided by photodetectors P3, P4 and P6, and PHS3 is adjusted using controllable DC current DC3 456 based on measurements provided by photodetectors P5, P6 and P7. For example, PHS1 can be adjusted based on the phase difference between $E_x$ and $E_y$ components based on a relationship similar to that expressed in Equation (9) (e.g. with $P_4$ used in place of $P_3$). Other phase shifters can be controlled based on other numerical relationships which may depend on the architecture of the polarization controller. The adjustments however may be based on a more complicated combination of the readings from all the detectors depending on the functionality of each stage in the SOP control design and architecture.

In some embodiments, up to three of the eight photodetectors 462, 464, 466, 468, 482, 484, 486, 488 illustrated in FIG. 4 are omitted, such that two photodetectors are located at the inputs of one of the 2×2 couplers, one photodetector is located at one of the two outputs of the same 2×2 coupler, and, for each other remaining 2×2 coupler, one photodetector is located at one of the two inputs and one photodetector is located at one of the two outputs.

For example, with reference to FIG. 4, photodetectors P3 466, P5 482, and P8 488 may be omitted. In this case, two photodetectors are located at the inputs of the first 2×2 coupler, one photodetector is located between an output of the first coupler and a corresponding input of the second coupler, one photodetector is located between an output of the second coupler and a corresponding input of the third coupler, and one photodetector is located at the output of the third coupler.

To compensate for a reduced number of photodetectors, estimates of the power of light that would be observed by photodetectors at the locations lacking photodetectors can be generated by the processing section. For example, for a 2×2 coupler having three photodetectors, an estimate of the power of light at the fourth (unmeasured) line of the 2×2 coupler can be determined based on the output from the three photodetectors and the conservation of power using the procedure previously described.

When the estimate corresponds to power of light carried by an optical transmission line that is located between the 2×2 coupler and a further 2×2 coupler serially linked thereto, the estimate can in turn be used to generate a further estimate of the power of light at an unmeasured line of the further 2×2 coupler. For example, in FIG. 4, when P3 466 is omitted and an estimate corresponds to power of light at output 422 of coupler 420 is generated, this estimate can be also used to determine power of light at the input to coupler 440 by accounting for any losses introduced by PHS2 435. This estimated power of light at the input to coupler 440 can then be used as part of a further operation to estimate power of light at another input or output of the coupler 440. That is, the first estimate can be used as one of three power of light measurements which are input into the procedure as previously described. Therefore, it can be readily seen that, given an arrangement in which one 2×2 coupler has at least three photodetectors coupled thereto, and all other 2×2 couplers connected in series have at least two photodetectors coupled thereto, estimates for power of light at the unmeasured lines of all 2×2 couplers can be generated, for example sequentially or concurrently.

In the above, a photodetector may be coupled to a 2×2 coupler in the sense that the photodetector is connected to an input or output of the 2×2 coupler, with a component such as a phase shifter optionally placed between the photodetector tap location and the input or output of the 2×2 coupler. It is noted that a given photodetector may be simultaneously coupled to two different 2×2 couplers, when the photodetector is coupled to a line which connects an output of a first 2×2 coupler to an input of a second 2×2 coupler. As such, it can be considered herein that, for each additional 2×2 coupler provided in series, one additional photodetector is provided.

In various embodiments, the operation of the processing section to generate estimates of power of light, that would be observed by a photodetector at a location lacking such a photodetector, can be viewed as providing a virtual photodetector at that location. The use of virtual photodetectors allows for optical hardware complexity to be reduced at the expense of negligible increased signal processing complexity. Potential locations of virtual photodetectors in FIG. 4 correspond to the photodetectors providing measurements P3 466, P5 482 and P8 488.

It is a common practice, in the design of polarization controllers, to use directional 2×2 couplers in which the two input signals are split and mixed evenly (referred to as 50/50 couplers). Although the above treatment assumes that the 2×2 coupler is a 50/50 coupler, a similar process can be performed for other types of couplers. Provided the matrix transfer functions of the phase shifters and coupler are known, the power of light provided by each of the photodetectors can be determined, and the calculations corresponding to Equations (1) to (9) above can be performed substituting the particular transfer function of the 2×2 coupler being used.

Figure 5:
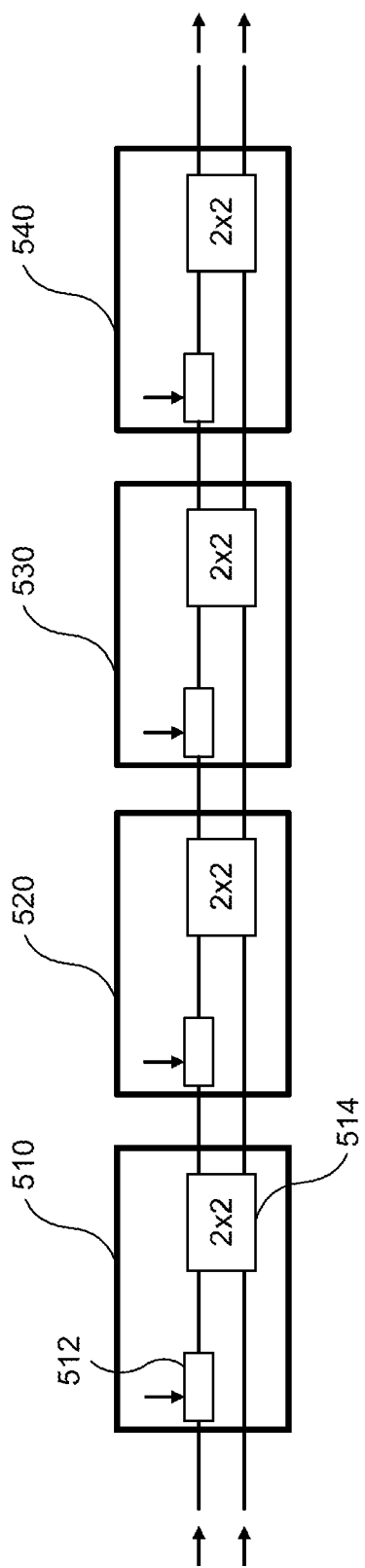
FIG. 5 illustrates a multi-stage polarization controller incorporating optical measurement, in accordance with an embodiment of the present invention.

FIG. 5 illustrates a portion of a multi-stage polarization controller provided in accordance with an embodiment of the present invention. Four serially-connected stages 510, 520, 530, 540 of the polarization controller are shown, each stage having a phase shifter and a 2×2 coupler, such as a 50/50 directional coupler. For example the first stage 510 includes a phase shifter 512 and a 2×2 coupler 514. Additional similar stages can also be provided. Alternatively, fewer stages can be provided. According to embodiments of the present invention, all of the stages are furnished with at least two photodetectors, and at least one of the stages is furnished with at least three photodetectors. For each stage, at least one input of the 2×2 coupler for that stage is coupled to a photodetector, and at least one output of the 2×2 coupler is coupled to another photodetector. Photodetectors located between two adjacent stages may be shared by those two stages, thereby reducing the number of photodetectors. In other words, when first and second 2×2 couplers, of two adjacent stages, are connected in series, a single photodetector may be used as both the photodetector coupled to the output of the first 2×2 coupler and the photodetector coupled to the input of the second 2×2 coupler.

In some embodiments, one of the earlier stages, such as the first stage 510, is furnished with at least three photodetectors. This allows the incoming optical signals to be measured more accurately before applying control. This can improve control stability and remove measurement limitations as early as possible.

In some embodiments, assuming the input light has certain characteristics; one or more additional photodetectors may be removed, provided that the information provided by such a photodetector can be replaced by estimates which are based on the assumed properties of the input light. In such cases, fewer photodetectors than the above-described minimum of two photodetectors per stage and one stage having three photodetectors may be provided.

Figure 6A:
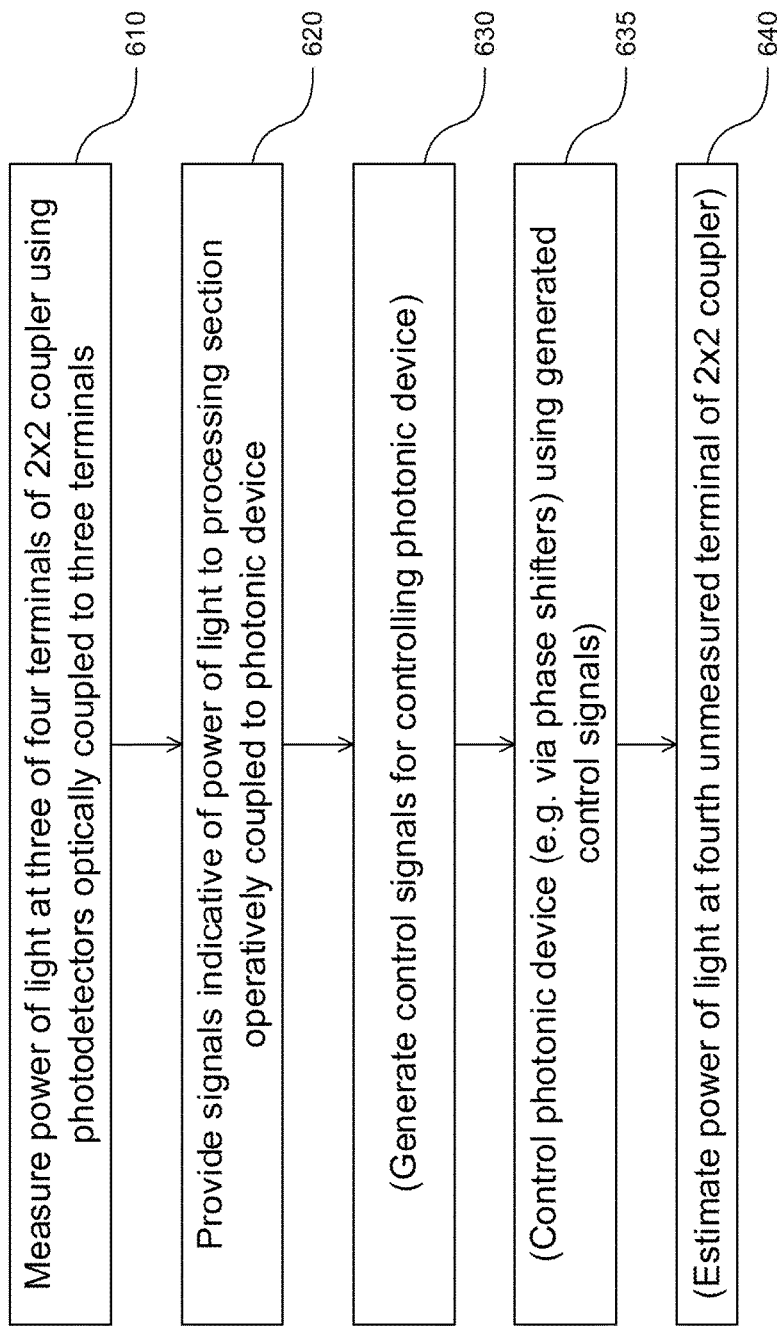
FIG. 6A illustrates a method for obtaining optical measurements, in accordance with an embodiment of the present invention.

FIG. 6A illustrates a method for obtaining optical measurements for a multi-stage photonic device, such as a polarization controller, in accordance with an embodiment of the present invention. The method comprises measuring 610 power of light at three of four terminals of a 2×2 coupler using photodetectors optically coupled to the three terminals. Each terminal is coupled to a separate photodetector. The photodetectors may be coupled, via a tap, to a terminal or to an optical transmission line directly or indirectly connected to the terminal.

The method further comprises providing 620 signals indicative of power of light from the photodetectors to a processing section operatively coupled to the photonic device. The method may further comprise generating 630 control signals for controlling the photonic device, for example by the processing section. The method may then further comprise controlling 635 the photonic device using the generated control signals.

The method may further comprise estimating 640 power of light at a fourth unmeasured terminal of the 2×2 coupler, by the processing section, based on the signals indicative of measured power of light.

The method may further comprise a further estimation operation for estimating power of light at a terminal of a further 2×2 coupler (attached in series with the first 2×2 coupler). The estimate based on the measurements and estimates of power of light obtained as described in FIG. 6A, along with further measurements of power of light at terminals of the further 2×2 coupler. For example, the first 2×2 coupler may be the coupler 420 in FIG. 4, while the further 2×2 coupler may be coupler 440. Having regard to FIG. 6B, the further estimation operation includes measuring 655 power of light at two of four terminals of the further 2×2 coupler using photodetectors (e.g. photodetectors P4 468 and P6 484, with photodetectors P3 466 and P5 482 omitted). The further estimation operation also includes providing 660 signals indicative of the measured power of light to the processing section. The further estimation operation also includes estimating 665 power of light at an unmeasured terminal of the further 2×2 coupler based on the signals indicative of the measured power of light at the two terminals of the further 2×2 coupler along with a further estimate of power of light at another terminal of the 2×2 coupler. This further estimate may be provided based on the estimation 640. Other further estimation operations for other 2×2 couplers can similarly be performed.

Figure 6B:
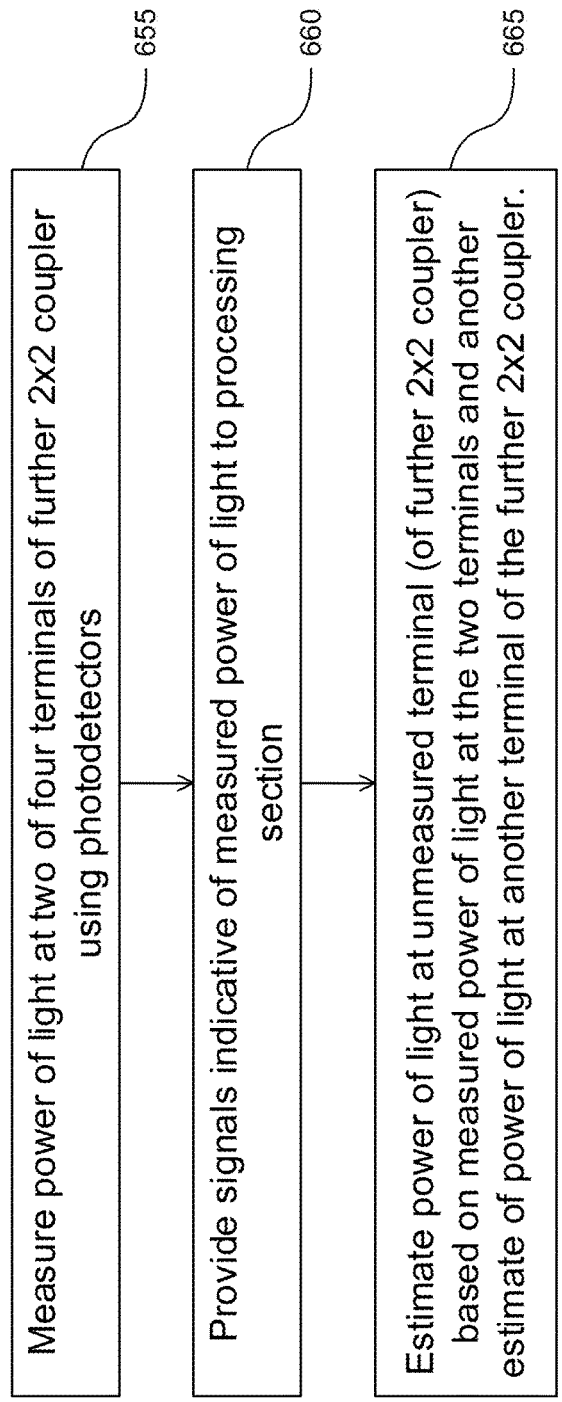
FIG. 6B illustrates a method for obtaining optical measurements, in accordance with another embodiment of the present invention.

The further estimation operation of FIG. 6B is explained in more detail as follows. Suppose a 2×2 coupler has terminals A, B, C and D, and power is measured only at terminals A and C. Further suppose that an estimate of power at terminal B is available. Then the power at terminal D can be estimated using the power measurements for terminals A and C along with the estimate of power at terminal B. As such, only two measurements and an estimate are required to estimate the power at terminal D.

When a photodetector is located between the first 2×2 coupler and the further 2×2 coupler, measuring power by this photodetector and providing the signals indicative of the measured power by this photodetector may have already been performed. Therefore, aspects of the further estimation operation of FIG. 6B may overlap with other performed operations illustrated in FIG. 6A.

Figure 7:
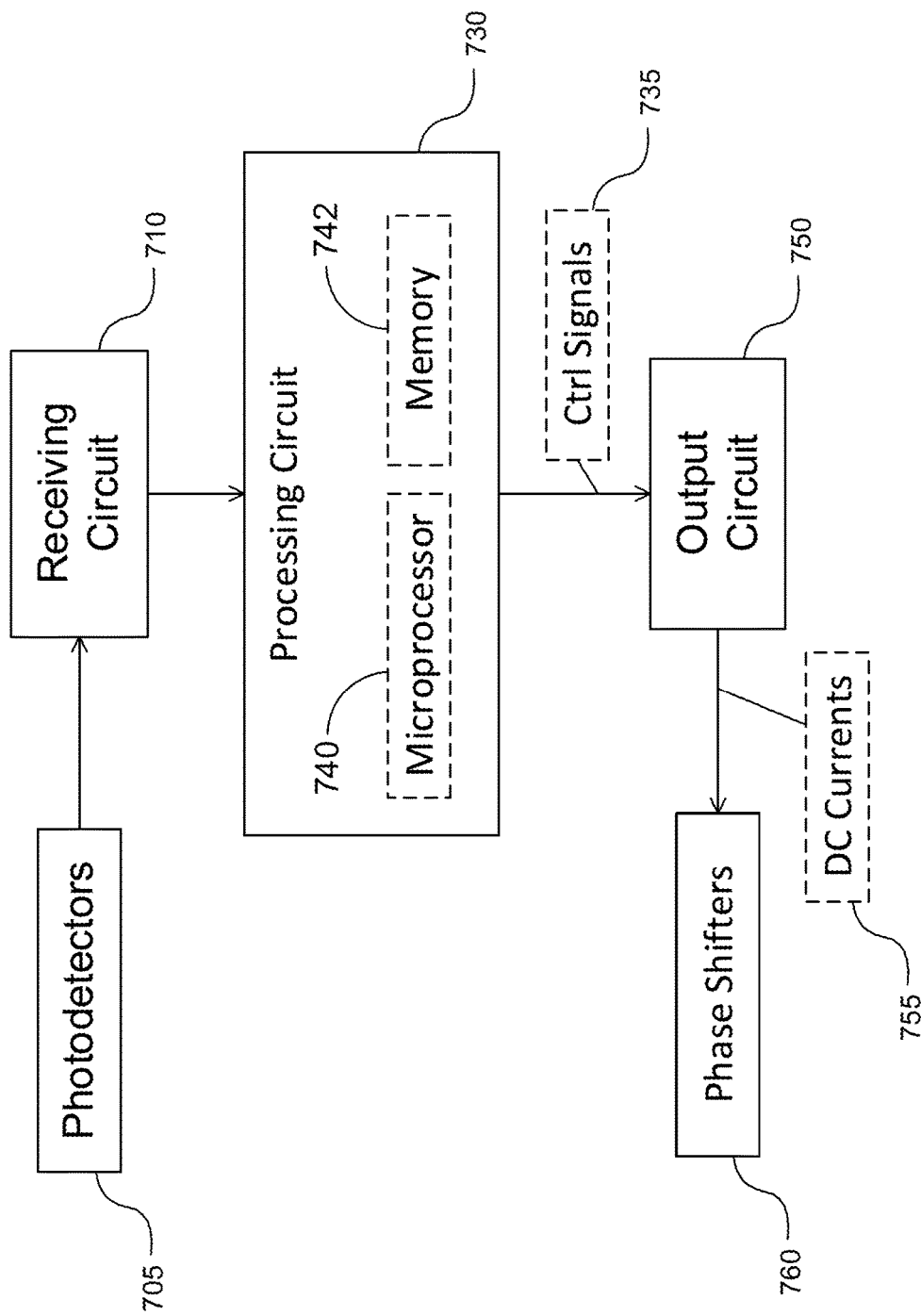
FIG. 7 illustrates a processing section for receiving and processing photodetector signals, according to an embodiment of the present invention.

In various embodiments, and with reference to FIG. 7, the processing section comprises a receiving circuit 710, a processing circuit 730, and an output circuit 750. The receiving circuit 710 receives signals from the photodetectors 705 and converts them into a form usable by the processing circuit. The receiving circuit 710 can comprise an analog-to-digital converter circuit, sampling circuit, amplifier circuit or the like. The processing circuit 730 receives the signals from the receiving circuit 710 and processes the signals to provide desired output, such as an indication of state of polarization and/or control signals 735. The processing circuit can include digital or analog electronics for providing output signals based on input signals in a predetermined manner. By way of example, the processing circuit can include a microprocessor 740 executing program instructions stored in memory 742 for performing the processing operations. The memory 742 can include a lookup table which relates input signals to output signals. The output circuit 750 receives the output signals and converts them into a form usable by further stages. For example, when the output signals are used for driving DC current sources in a feedback control loop, the output circuit can include a digital-to-analog converter circuit, current drivers, or the like, or a combination thereof. As illustrated, and by way of non-limiting example, the control signals 735 are delivered to the output circuit 750 where they are converted to controlled DC currents 755 which are routed to phase shifters 760 for control thereof.

The receiving circuit 730, the processing circuit 740 and the output circuit 750 may be co-located or some components may be in different locations. For example, the processing circuit 740 may be provided by a microprocessor which located in a computing device which is separate from the photodetectors.

The processing circuit 730 can convert digital representations of the signals received from the photodetectors 705 into values indicating power of light at particular locations associated with the photodetectors, for example by applying a scaling factor. The processing circuit 730 can process multiple values indicative of power of light at different locations together to generate control signals.

It should be appreciated that the details of the control method used can be dependent on the architecture of the polarization controller. For example, quantitative or functional relationships between photodetector signals and phase shifter control signals can depend on the polarization controller architecture. However, in each case the photodetectors provide sufficient feedback data for use in controlling the phase shifters (and possibly other components) of the polarization controller.

Through the descriptions of the preceding embodiments, the present invention may be implemented by using hardware only or by using software and a necessary universal hardware platform. Based on such understandings, some aspects (such as feedback control operations) of the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention. The software controlling the hardware may co-exist on the same module or it may be an external controller which reads the data and acts accordingly. This is more suited for software-defined networking (SDN) where the control of the physical architecture may be performed by a separate device than the physical architecture being controlled.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A photonic device comprising:
   a coupler having two inputs and two outputs making a total of four inputs and outputs;
   a plurality of photodetectors coupled to three of the four inputs and outputs and configured to provide signals indicative of power of light at each of the three of the four inputs and outputs;
   a further coupler connected in series with the coupler and having two further inputs and two further outputs for a total of four further inputs and outputs; and
   a set of one or more further photodetectors coupled to a respective one or more of the four further inputs and outputs of the further coupler and configured to provide signals indicative of power of light at each of the respective one or more of the four further inputs and outputs of the further coupler; and
   a processing section configured to receive the signals provided by the plurality of photodetectors and the signals provided by the set of further photodetectors.

2. The photonic device of claim 1, wherein the photonic device is a polarization controller, and wherein the processing section is configured to provide control signals for adjusting one or more phase shifters of the polarization controller based on the signals provided by the plurality of photodetectors.

3. The photonic device of claim 1, further comprising a polarization rotator-splitter configured to receive an incoming optical signal and split the incoming optical signal into two orthogonal components.

4. The photonic device of claim 1, further comprising a phase shifter configured to induce a relative phase shift between two components of an optical signal, thereby providing two phase-shifted components of the optical signal, and provide the two phase-shifted components to two inputs of the coupler.

5. The photonic device of claim 1, wherein the coupler is a multimode interference (MMI) coupler.

6. The photonic device of claim 1, wherein the processing section is further configured to estimate power of light at one of the four inputs and outputs of the coupler other than the three inputs and outputs to which the plurality of photodetectors are coupled.

7. The photonic device of claim 1, wherein the set of one or more further photodetectors comprises two photodetectors
   coupled to two of the four further inputs and outputs of the further coupler.

8. The photonic device of claim 1, wherein the set of further photodetectors includes at least one of said plurality of photodetectors.

9. The photonic device of claim 1, wherein the processing section is further configured to estimate power of light at one of the four further inputs and outputs other than the respective one or more of the four further inputs and outputs to which the further photodetectors are coupled.

10. The photonic device of claim 1, further comprising:
    a polarization rotator-splitter configured to receive an incoming optical signal and split the incoming optical signal into two components;
    a first phase shifter configured to induce a relative phase shift between the two components, thereby providing a first pair of phase-shifted components of the optical signal, the first pair of phase-shifted components provided to two inputs of the coupler;
    a second phase shifter configured to induce a relative phase shift between two outputs of the coupler, thereby providing a second pair of phase-shifted components of the optical signal, the second pair of phase-shifted components provided to two inputs of the further coupler;
    wherein the processing section is configured to provide control signals for adjusting the first phase shifter and the second phase shifter based on the signals provided by the plurality of photodetectors and the set of further photodetectors.

11. The photonic device of claim 1, further comprising:
    a second further coupler connected in series with the coupler and having two second further inputs and two second further outputs for a total of four second further inputs and outputs; and
    a second set of one or more further photodetectors coupled to a respective one or more of the four second further inputs and outputs and configured to provide signals indicative of power of light at each of the two of said four second further inputs and outputs of the second further coupler,
    wherein signals provided by the second set of further photodetectors are provided to the processing section.

12. A measurement device integrated into a photonic device having a coupler having two inputs and two outputs making a total of four inputs and outputs, and a further coupler connected in series with the coupler and having two further inputs and two further outputs for a total of four further inputs and outputs, the measurement device comprising:

a plurality of photodetectors coupled to three of the four inputs and outputs and configured to provide signals indicative of power of light at each of the three of the four inputs and outputs, and a set of one or more further photodetectors coupled to a respective one or more of the four further inputs and outputs of the further coupler and configured to provide signals indicative of power of light at each of the respective one or more of the four further inputs and outputs of the further coupler, wherein a processing section operatively coupled to the photonic device is configured to receive the signals provided by the plurality of photodetectors and the signals provided by the set of one or more further photodetectors.

13. The measurement device of claim 12, wherein the processing section is configured to estimate power of light at one of the four inputs and outputs, other than the three inputs and outputs to which the plurality of photodetectors are coupled.

14. The measurement device of claim 12, wherein the set of one or more further photodetectors comprises two photodetectors coupled to two of the four further inputs and outputs of the further coupler.

15. A method for obtaining optical measurements in a photonic device, the photonic device having a coupler having two inputs and two outputs making a total of four inputs and outputs, and a further coupler connected in series with the coupler, the further coupler having two further inputs and two further outputs making a total of four further inputs and outputs, the method comprising:

measuring power of light at a plurality of photodetectors each optically coupled to a respective one of three of the four inputs and outputs of the coupler;

measuring power of light at a further one or more photodetectors each optically coupled to a respective one or more of the four further inputs and outputs of the further coupler; and providing signals indicative of power of light at each of the three of the four inputs and outputs and at each of the one or more of the four further inputs and outputs to a processing section operatively coupled to the photonic device.

16. The method of claim 15, wherein the photonic device is a polarization controller, the method further comprising generating, by the processing section, control signals for one or more phase shifters of the polarization controller.

17. The method of claim 15, further comprising generating, by the processing section, an estimate of power of light at an input or output of the coupler other than said three of the four inputs and outputs.

18. The method of claim 15, wherein the further one or more photodetectors comprises two photodetectors
each optically coupled to a respective one of two of the four further inputs and outputs of the further coupler.

19. The method of claim 15, wherein the photonic device comprises a plurality of additional couplers connected in series with the coupler, the method further comprising measuring power of light at one respective input and one respective output of each of the additional couplers, and estimating power of light at one unmeasured input and one unmeasured output of at least one of the additional couplers.

20. The method of claim 19, further comprising using single photodetector to measure power of light at both an output of a first coupler and an input of a second coupler connected adjacent to the first coupler.

21. The photonic device of claim 1, wherein the processing section is further configured to determine a parameter corresponding to a relative phase relationship between light at said two inputs of the coupler.

22. The method of claim 15, further comprising: determining a parameter corresponding to a relative phase relationship between light at said two inputs of the coupler.

23. The photonic device of claim 1, wherein the plurality of photodetectors are coupled to at least one of the two inputs and at least one of the two outputs of the coupler.

24. The measurement device of claim 12, wherein the plurality of photodetectors are coupled to at least one of the two inputs and at least one of the two outputs of the coupler.

25. The method of claim 15, wherein the plurality of photodetectors are coupled to at least one of the two inputs and at least one of the two outputs of the coupler.

* * * * *